UNITED STATES PATENT OFFICE.

OSCAR OLDBERG, OF WASHINGTON, DISTRICT OF COLUMBIA.

IMPROVEMENT IN SOLUTIONS OF BALSAMIC GUMS FOR MEDICINAL PURPOSES, COSMETICS, PERFUMERY, &c.

Specification forming part of Letters Patent No. 118,813, dated September 12, 1871.

*To all whom it may concern:*

Be it known that I, OSCAR OLDBERG, of the city and county of Washington, in the District of Columbia, have invented a new and useful beautifying, healing, and preserving preparation, which I denominate "Oldberg's Borobalsamine," of which the following is a specification:

My invention relates to a preparation for preserving and beautifying the complexion, the teeth, &c., by virtue of its balsamic and highly antiseptic properties, which are also highly efficacious for purifying wounds and ulcers, producing a healthy granulation, and hastening permanent healing. My new preparation consists in combining the healing properties of certain well-known balsamic resins and gums with the highly antiseptic properties of boric acid, compounded so as to produce the best results. In carrying out this combination I have discovered that a concentrated solution of boric acid dissolves, among others, the following balsamic gums in the quantities stated: Benzoin, ten per cent.; balsam tolu, five per cent.; balsam Peru, five per cent.; myrrh, fifteen per cent. As these gums will not dissolve in water alone, they have not heretofore been made available for healing purposes in a convenient form; but by my discovery they are readily reduced to an aqueous solution by an agent which, by itself, not only resists but corrects all tendencies to putrefaction.

It is, moreover, a pleasant remedy, having no irritating effect, such as is produced by preparations containing volatile oils heretofore used for such purposes, and particularly when the parts are deprived of the epidermis. My preparation is also especially beneficial for skin diseases, such as erysipelas, pimples, ring-worms, &c., upon which this newly-discovered antiseptic seizes and acts with fine effect, which may be illustrated by the fact that a tablespoonful of Oldberg's Borobalsamine will preserve a quantity of meat from decomposition for a period of four days or longer. The solution, when thus compounded, is also mixed with a suitable quantity of glycerine, not exceeding fifty per cent. The addition of glycerine is to impart a smooth consistency to the preparation, which is soluble in water, and thus allow it to be washed off and renewed, which cannot be done with common ointments in which the balsams are applied as remedial agents. Any one or two of the above-named gums may be used in the preparation, or they may all be used if desired.

Having described my invention, I claim—

1. A beautifying, healing, and antiseptic preparation, consisting of a solution of one or more balsamic gums in a solution of boric acid.

2. The combination of a solution of boric acid and one or more balsamic gums with glycerine, to produce a smooth consistency and allow the preparation to be renewed, as described.

OSCAR OLDBERG.

Witnesses:
A. E. H. JOHNSON,
J. W. HAMILTON JOHNSON.